May 17, 1949. E. PIETZ 2,470,185
VIBRATION ISOLATOR
Filed May 29, 1945 2 Sheets-Sheet 1

*Inventor:*
*Ervin Pietz*
Charles E. Crede
*Agent*

May 17, 1949.   E. PIETZ   2,470,185
VIBRATION ISOLATOR
Filed May 29, 1945   2 Sheets-Sheet 2

Inventor:
Ervin Pietz
Charles E. Crede
Agent

UNITED STATES PATENT OFFICE 2,470,185

VIBRATION ISOLATOR

Ervin Pietz, Cambridge, Mass., assignor to Lawrence N. Barry, George W. Foss, and Ervin Pietz, doing business as The L. N. Barry Company, Cambridge, Mass.

Application May 29, 1945, Serial No. 596,483

2 Claims. (Cl. 248—22)

My invention relates to vibration isolators; i. e., means to greatly reduce the magnitude of vibrations transmitted to delicate apparatus or to prevent the vibrations induced by rotating or reciprocating machinery from causing disturbances in adjacent equipment.

An isolator of the type disclosed herein has particular application in aircraft for the purpose of protecting electronic and other delicate apparatus from the destructive vibrations caused by the action of the engines and propellers, and by the air of the slipstream impinging upon the structure of the airplane. My invention has further application to aircraft for mounting the engines to prevent the transmission of vibration to other parts of the airplane. A similar application is in the mounting of automobile engines. Additional applications are in the mounting of delicate equipment in automobiles, trucks and railway trains and in isolating the motor vibrations in washing machines, refrigerators, and similar equipment.

The mounting of electronic equipment in aircraft involves a special problem. Maintenance practice on equipment of this type dictates that the equipment be readily removable and replaceable. As a result, the equipment is generally set upon a tray which is attached to the aircraft by means of vibration isolators located underneath the tray. Airplane engines operate within a wide range of speeds, above a predetermined minimum. To properly prevent transmission of the vibration from such engines to the delicate equipment, it is essential that the natural frequency of the equipment upon the isolators in all natural modes of vibration be less than the minimum frequency of engine vibration. It is an object of my invention, then, to provide a mount which has a low natural frequency in all natural modes of vibration when located underneath the equipment to be isolated.

As will hereinafter be described in detail, an isolator located underneath the equipment has natural frequencies low in all natural modes of vibration only if the lateral stiffness of the mount is low compared with the vertical stiffness. It is another object of my invention, then, to arrange the rubber parts in such a manner that lateral stiffness can be made very low; i. e., the lateral flexibility is high.

Another object of my invention is to design a mount which has a minimum height together with a stiffness low enough for supporting very light equipment with the required natural frequencies. The stiffness of a piece of rubber can generally be reduced by increasing the thickness. I accomplish such an effective increase in thickness without increasing the dimensions by using overlapping or staggered resilient elements in series.

A further object of my invention is to maintain a high stability of the mount by employing a plurality of resilient elements in series and in staggered relation to one another. Such an arrangement has greater stability than a single resilient element of equivalent stiffness.

A still further object of my invention is to design a vibration isolator which utilizes solid rubber in place of sponge rubber. Sponge rubber has a high drift rate, particularly at elevated temperatures; it is susceptible to damage if moisture freezes in the pores; it deteriorates rapidly when exposed to ozone; and it lacks consistency in manufacture. However, it has a much lower stiffness than solid rubber which makes it useful for supporting light weight equipment. I attain an equally low stiffness using solid rubber by forming the rubber parts with a small load-carrying area and a large surface over which the rubber is free to bulge or expand. This form factor, together with the staggered or overlapped elements, enables me to successfully mount equipment in the weight range for which sponge rubber elements are normally used.

Rubber and similar materials normally used for the resilient elements in vibration isolators of the type disclosed slowly drift or compress when subjected to a constant load. This drift increases with an increase in unit strain or unit static deflection. Since there is a fixed relation between natural frequency and total strain (static deflection) in a resilient system, the total strain or static deflection is determined by the operating requirements for the isolator. It is an object of my invention to reduce the drift by reducing the unit strain. This is accomplished, while holding the total strain constant, by increasing the total thickness of rubber.

It is necessary that vibration isolators used in aircraft and certain other types of machines have means to limit total motion of the mounted equipment. When landing, airplanes experience shock motions which would cause equipment within the airplane to impact against adjacent structures unless restraining means are employed. I provide such restraining means, hereinafter called snubbers or secondary resilient elements, and locate such snubbers adjacent the perimeter of the equipment so that they function as efficiently as possible in preventing tipping. The supporting elements, or primary resilient elements, are located inwardly of the perimeter to give better natural frequency conditions.

Snubbers are effective in preventing large amplitudes of vibration at the resonant frequency of the flexible element, such as when the airplane engine is being accelerated from idling to operating speed or when the motor of a refrigerator passes through the resonant frequency of the mounts in coming up to speed. When the clearance to the snubber is small and the snubber is made of an undamped material, bouncing between the top and bottom snubbers is experienced at resonance. This is undesirable because large stresses may be caused in the equipment by the violent snubber action. It is an object of my invention to provide damped snubbers so that the rebound from each snubber is reduced in velocity and the severity of the snubber action is consequently reduced.

When the frequency of the forcing vibration is increased so as to pass through the resonant frequency of the vibration isolators, the amplification increases due to resonant action and bouncing on the snubbers occurs. In the case of the conventional, undamped snubbers, bouncing continues as a pseudo-resonant vibration even though the frequency has increased well beyond the actual resonant frequency. As a further object of my invention, I provide damped snubbers to prevent pseudo-resonant vibrations throughout a wide frequency range.

Another object of my invention is to provide unit mounts which can be conveniently attached to equipment of odd shapes, such as cylindrical containers.

Other objects and advantages of my invention will become apparent from the following detailed description by referring to the accompanying drawings in which.

Figure 8:
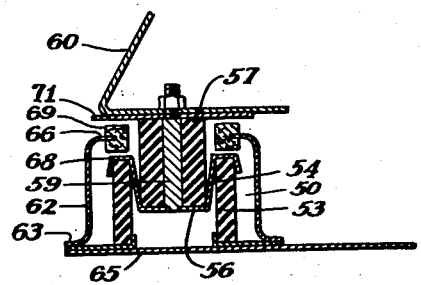
Figure 8 is an enlarged sectional view of a portion of Figure 7.
Figure 11:
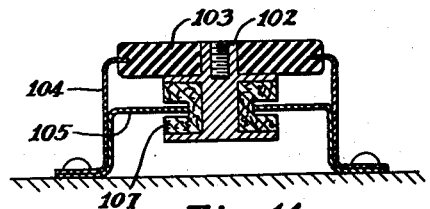
Figure 9:
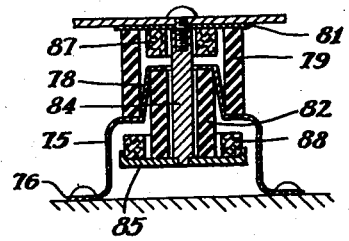
Figure 10:
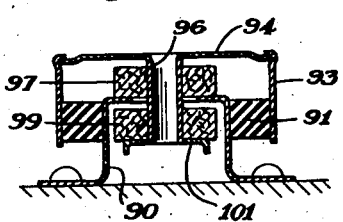

Figures 9, 10, and 11 are views similar to Figure 8 showing several modified forms of my invention.

Figure 1:
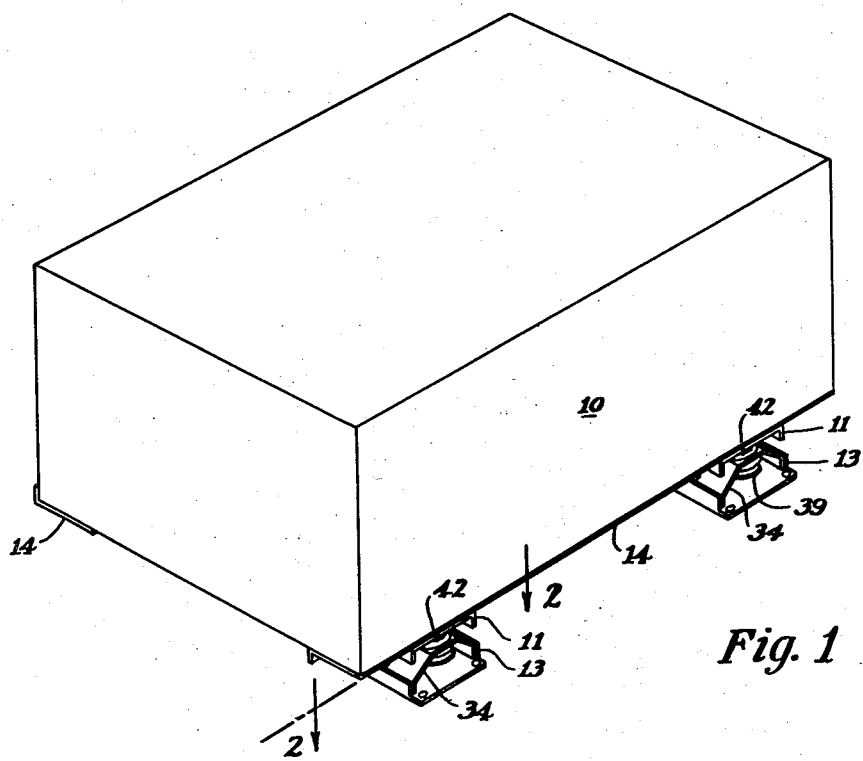
Figure 1 is a perspective view showing the application of my invention to the isolation of vibration from aircraft equipment.
Figure 2:
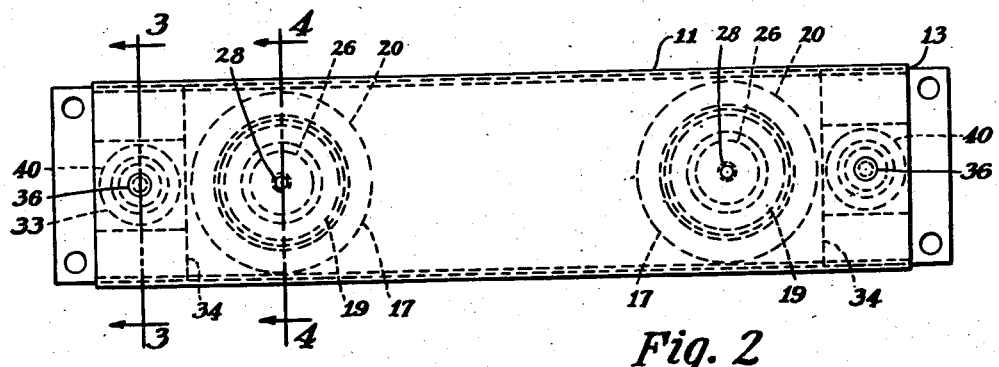
Figure 2 is a partial plan view on line 2—2 of Figure 1.
Figure 3:
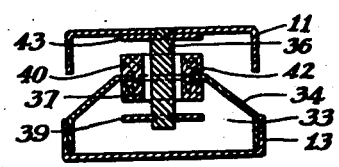
Figure 3 is a section on line 3—3 of Figure 2.
Figure 4:
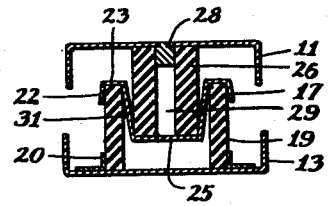
Figure 4 is a section on line 4—4 of Figure 2.

As shown in Figure 1, the equipment 10 to be isolated is set upon the vibration isolator and secured thereto in any convenient manner. The isolator is comprised of two downwardly facing upper channels 11 and two upwardly facing lower channels 13, the upper channels 11 preferably being joined by cross members 14 to form an integral unit. The equipment 10 is secured to the cross members 14 or upper channels 11. The lower channels 13 are rigidly attached to the structure of the airplane or other foundation.

Figure 5:
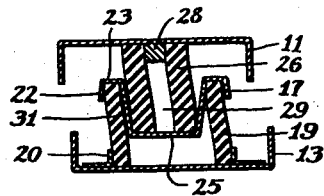
Figure 5 is a view similar to Figure 4 showing the vibration isolator deflected laterally.

In the embodiment of my invention illustrated, four flexible load-carrying assemblies 17 are provided. Each of the assemblies 17 includes a lower thin-walled cylindrical element 19, preferably rubber or rubber-like material, positioned by the rigid ring 20 secured to a lower channel 13. The rigid intermediate piece 22 has an outer annular part 23 resting upon the upper face of the resilient element 19 and a central part 25 which protrudes downwardly into the hollow center of the resilient element 19. An upper cylindrical element 26, also of rubber or rubber-like material, rests upon the central part 25 of the intermediate piece 22 and supports, upon its upper face, the upper channel 11. The resilient elements may be metallic helical springs in place of rubber cylinders. The upper channel 11 is positioned upon the upper resilient element 26 by a pin 28 rigidly attached to the channel 11 and extending downwardly into the central recess of the element 26. The outer annular part 23 and the central part 25 of the intermediate piece 22 are joined by a connecting part 31 which is flared downwardly and inwardly to permit shearing and tipping of the resilient elements 19, 26 as shown in Figure 5 when the upper channel moves laterally relatively to the lower channel 13. The flexible load-carrying assemblies 17 are preferably spaced inwardly from the ends of the channels 19, 26 for reasons to be hereinafter described.

The upper (11) and lower (13) channels are held together by the snubbing assemblies 33 located adjacent the ends of the channels 11, 13. Each such assembly comprises a bridge 34 attached to the lower channel 13 and a pin 36 secured to the upper channel 11 and depending through a clearance hole 37 in the bridge 34. A washer 39, larger than the hole 37 in the bridge 34, is fixed to the lower end of the pin 36. A grommet 40 is slidably fitted to the pin 36 and the central groove 42 of the grommet receives the bridge 34. The upper (43) and lower (39) washers engage the grommet after predetermined relative motion between upper (11) and lower (13) channels. The grommet 40 is preferably resilient to provide a cushioned limiting device and preferably made of a higly damped material such as felt (rubber impregnated for protection), synthetic rubber, or other suitable material. The damping functions to deaden the rebound from the snubbers and thereby reduces the severity of vibrations which involve snubber action. The upper (26) and lower (19) resilient members are substantially undamped; i. e., the damping is small so as not to impair the efficiency of vibration isolation.

The vibrations in aircraft cover a wide range of frequencies and an isolator, to be effective, must have a low natural frequency; i. e., it must be very flexible. Vibration isolators for aircraft have heretofore been made of sponge rubber because of the softness of such material. However, there are disadvantages, described above, associated with sponge rubber. By forming the rubber parts in a novel manner, I use solid rubber and obtain a sufficiently low natural frequency. It is shown in the paper "Rubber springs," by Walter C. Keys, in the May, 1937, issue of "Mechanical Engineering" (pages 345 to 349) that the stiffness of a rubber part decreases as the ratio of load-carrying area to bulge area decreases. By forming the rubber parts as hollow cylinders, I maintain this ratio low and consequently employ rubber parts which are soft. Furthermore, such a cylinder is very stable under a vertical load and has ability to deflect laterally in shear as shown in Figure 5. This method of deflection makes possible a low lateral stiffness.

Figure 6:
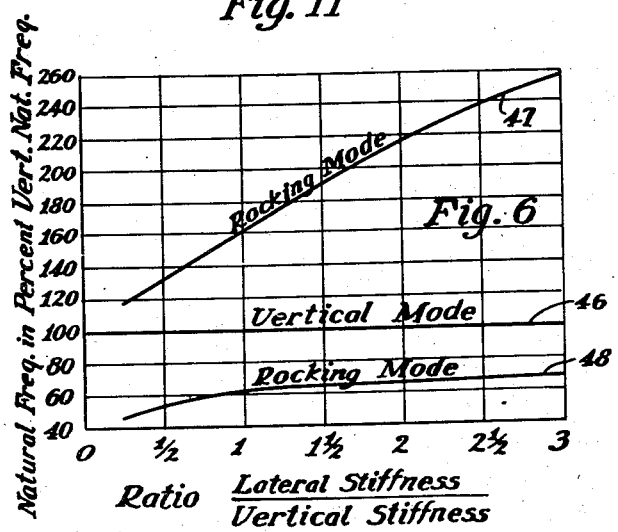
Figure 6 is a graph showing the natural frequencies in several modes of vibration of equipment mounted as shown in Figure 1.

Figure 6 is a graph showing the relative values of three natural frequencies of a unit of equipment mounted upon a vibration isolator. The isolator is located underneath the equipment, as shown in Figure 1, and the resilient assemblies are spaced inwardly from the ends of the channel members 11, 13. The horizontal line 46 in Figure 6 marked "vertical mode" is the natural frequency in a vertical translational mode which is independent of the lateral stiffness of the isolator. The other two lines 47, 48 represent the natural frequencies in rocking modes about two mutually parallel axes. It is one of the necessary conditions to vibration isolation that the natural frequencies in all modes be substantially below the frequency of the vibration to be isolated. The natural frequency in the higher rocking mode (line 47 in Figure 6) is the troublesome one in the case illustrated. It is evident from an inspection of Figure 6 that this natural frequency can be kept sufficiently low only by maintaining a low lateral mount stiffness relative to the vertical stiffness. It is this consideration which dictates many features of the mounts—the thin hollow cylindrical rubber elements and the offset central metal piece formed with flared flanges and intermediate parts to permit ready lateral deflection of the rubber elements. This enables me to maintain the ratio of lateral to vertical stiffness low and the spread of natural frequencies consequently low. The maximum efficiency of vibration isolation is thus attained.

Figure 7:
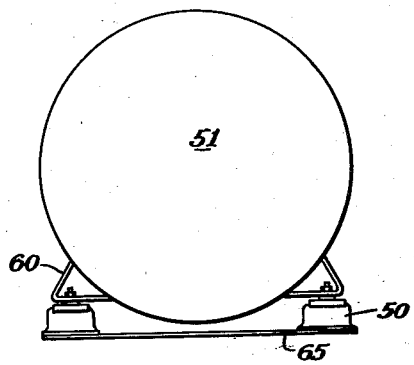
Figure 7 shows a modified form of my invention applied to a cylindrically shaped equipment.

Figures 7 and 8 show an embodiment of my invention which takes the form of a unit mount 50. Such a mount has general purpose applications but is particularly applicable to equipment of odd shape, such as the cylindrical equipment 51. The mount 50 comprises a hollow cylindrical resilient element 53, preferably made of solid rubber; a rigid intermediate piece 54 having its central part 56 extending downwardly into the hollow element 53; and the upper hollow resilient element 57 resting upon the central part 56 of the piece 54. The mount 50 is attached to the equipment 51 by means of the stud 59 attached at its lower end to the piece 54 and at its upper end to the bracket 60 extending outwardly from the equipment 51. The mount is enclosed by the inverted cup 62 having its lower flange 63 attached to the base plate 65 of the mount and its upper flange 66 overlying the outer flange 68 of the intermediate piece 54, thereby retaining the piece 54 and consequently the equipment 51. The upper flange is fitted with a snubber 69 which engages the flange 68 on its lower side and the washer 71 on its upper side to limit motion across the mount. The snubber 69 is preferably made of a resilient material having high damping capacity such as felt (impregnated with rubber for protection), a synthetic rubber having high damping capacity, or other suitable material.

Figure 9 shows an alternative construction embodying my invention. The main supporting member is an inverted cup 75 having a base flange 76 for securing it to the foundation and an upwardly projecting central part 78. The upper resilient element 79 rests upon the outer shoulder of the cup 75 and supports the downward load imposed by the washer 81. A lower resilient element 82 fits within the central part 78 of the cup 75 and resists any upward force imposed by the central stud 84 and the lower washer 85. Snubbers are in the form of annular rings 87, 88 arranged to be engaged after a predetermined upward or downward motion across the mount. The snubber rings 87, 88 are preferably made of highly damped material to minimize bouncing action.

In the modification shown in Figure 10, the main supporting member is an inverted cup 90 to which is bonded the load-carrying resilient element 91. The resilient element 91 is in the form of an annular ring. An outer cylindrical member 93 is also bonded to the resilient element 91 and a cover plate 94 is crimped onto the cylindrical member 93. The equipment is attached by means of a bolt through the central tube 96 which is attached at its upper end to the cover plate 94. The snubber is in the form of two washers, one (97) overlying the cup 90 and being compressed between the cover plate 94 and the cup 90 when a downward force is applied to the mount. The lower snubbing washer 99 is compressed, when an upward force is applied, between the cup 90 and the member 101 attached to the lower end of the tube 96. The lower washer 99 is also effective when a horizontal force is applied. The snubbers are preferably made of a resilient, highly damped material.

Figure 11 illustrates a still further modification of my invention in which the load is carried from the central stud 102 through the bonded rubber disc 103 to the inverted cup 104. A secondary cup 105 fits underneath the cup 104 to provide rigid restraint for the snubbing grommet 107 attached to the central stud 102. The grommet 107 is preferably made of resilient, highly damped material.

The accompanying drawings illustrate the preferred form of the invention, though it is to be understood that the invention is not limited to the exact details of construction shown and described, as it is obvious that various modifications thereof, within the scope of the claims will occur to persons skilled in the art.

I claim:

1. Means adapted to be interposed between two bodies for the purpose of isolating vibration one from the other comprising an upper cylindrical rubber element in at least partial telescoped relation with a lower cylindrical rubber element, and an interposed relatively rigid piece engaging both of said elements so that the weight of said body is carried by said elements in series, said piece having inclined walls out of contact with said elements whereby said elements are free to deflect laterally to maintain all natural frequencies of the system low.

2. Means adapted to be interposed between two bodies for the purpose of isolating vibration one from the other comprising an upper cylindrical rubber element nesting at least partially within a lower cylindrical rubber element in spaced relation thereto, and an interposed relatively rigid lation thereto, and an interposed relatively rigid piece engaging both of said elements so that the weight of said body is carried by said elements in series, said piece having inclined walls out of contact with said elements whereby said elements are free to deflect laterally to maintain all natural frequencies of the system low.

ERVIN PIETZ.

REFERENCES CITED

The following references are of record in the file of this patent:

UNITED STATES PATENTS

| Number | Name | Date |
|---|---|---|
| 919,876 | Jalivet | Apr. 27, 1909 |
| 1,080,748 | Chatain | Dec. 9, 1913 |
| 2,195,180 | Marzeth | Mar. 26, 1940 |
| 2,359,917 | Hussman | Oct. 10, 1944 |
| 2,367,697 | Stitz et al. | Jan. 23, 1945 |
| 2,377,492 | Gorton | June 5, 1945 |
| 2,397,804 | Nakken et al. | Apr. 2, 1946 |
| 2,417,096 | Thiry | Mar. 11, 1947 |

FOREIGN PATENTS

| Number | Country | Date |
|---|---|---|
| 782,906 | France | Mar. 25, 1935 |